(12) United States Patent
Tong et al.

(10) Patent No.: US 11,929,628 B2
(45) Date of Patent: Mar. 12, 2024

(54) ELECTRONIC DEVICE AND CONTROL METHOD

(71) Applicant: Lenovo (Beijing) Limited, Beijing (CN)

(72) Inventors: Yufei Tong, Beijing (CN); Zhiyuan Duan, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 61 days.

(21) Appl. No.: 17/679,015

(22) Filed: Feb. 23, 2022

(65) Prior Publication Data

US 2023/0091479 A1    Mar. 23, 2023

(30) Foreign Application Priority Data

Sep. 22, 2021 (CN) .......................... 202111106965.5

(51) Int. Cl.
*H02J 50/20* (2016.01)
*H01Q 1/22* (2006.01)
*H04M 1/02* (2006.01)

(52) U.S. Cl.
CPC .............. *H02J 50/20* (2016.02); *H01Q 1/22* (2013.01); *H04M 1/026* (2013.01)

(58) Field of Classification Search
CPC .......... H02J 50/20; H01Q 1/22; H04M 1/026
See application file for complete search history.

(56) References Cited

U.S. PATENT DOCUMENTS 10,892,800 B1 *  1/2021  Katz ...................... H02J 50/12
11,271,611 B1 *  3/2022  Melone ............ H02J 13/00022
(Continued)

FOREIGN PATENT DOCUMENTS

CN       107181498 A      9/2017
CN       109378908 A      2/2019
(Continued)

OTHER PUBLICATIONS

Ma J, CN-211209701-U, Aug. 2020, CN (Year: 2020).*
Kim D, WO-2019208843-A1, Oct. 2019, WO (Year: 2019).*

*Primary Examiner* — Adam D Houston
(74) *Attorney, Agent, or Firm* — ANOVA LAW GROUP, PLLC

(57) ABSTRACT

An electronic device includes an antenna module configured to perform millimeter wave communication with an external radio frequency device; a radio frequency communication module configured to receive a millimeter wave communication signal transmitted by the external radio frequency device forwarded by the antenna module when the radio frequency communication module is connected with the antenna module; a radio frequency charging module configured to receive a millimeter wave charging signal transmitted by the external radio frequency device forwarded by the antenna module when the radio frequency charging module is electrically connected to the antenna module, and rectify the millimeter wave charging signal into a direct-current signal output; and a processing module electrically connected to the antenna module, the radio frequency communication module, and the radio frequency charging module, respectively to control the electrical connection between the antenna module and the radio frequency communication module, and/or the radio frequency charging module.

20 Claims, 7 Drawing Sheets

(56) References Cited

U.S. PATENT DOCUMENTS

| | | | |
|---|---|---|---|
| 11,316,378 B1* | 4/2022 | Melone | H02J 50/10 |
| 11,626,756 B1* | 4/2023 | Luzinski | H02J 50/23 |
| | | | 307/104 |
| 2021/0297103 A1* | 9/2021 | Kang | H01Q 5/307 |
| 2022/0239163 A1* | 7/2022 | Luzinski | H02J 50/20 |
| 2022/0239344 A1* | 7/2022 | Kapolnek | H02J 50/12 |
| 2022/0239346 A1* | 7/2022 | Melone | H02M 1/007 |
| 2022/0247224 A1* | 8/2022 | Melone | H02J 50/10 |
| 2023/0027625 A1* | 1/2023 | Jeon | H04W 52/34 |
| 2023/0076836 A1* | 3/2023 | Luzinski | H04B 5/0031 |
| 2023/0110538 A1* | 4/2023 | Kapolnek | H04B 5/0037 |
| | | | 455/41.1 |
| 2023/0120281 A1* | 4/2023 | Luzinski | H04L 43/0847 |
| | | | 324/615 |

FOREIGN PATENT DOCUMENTS

| | | | |
|---|---|---|---|
| CN | 211209701 U | | 8/2020 |
| CN | 211720339 U | * | 10/2020 |

* cited by examiner

ELECTRONIC DEVICE AND CONTROL METHOD

CROSS-REFERENCES TO RELATED APPLICATION

This application claims priority to Chinese Patent Application No. 20211110965.5, filed on Sep. 22, 2021, the entire content of which is incorporated herein by reference.

FIELD OF TECHNOLOGY

The present disclosure relates to the field of electronic technology and, more specifically, to an electronic device and a control method

BACKGROUND

With the development of communication electronic technology, electronic devices such as mobile phones have more and more diverse functions, such as ultra-wide band (UWB) positioning, radio frequency charging, near field communication (NFC), multi-band communication, and other functions, which provide great convenience for user' daily life and work.

The functions listed above need to be supported by corresponding antennas, which requires the deployment of additional antennas corresponding to each function in the electronic device. The additional antennas will not only increase the hardware cost, but also take up the limited space in the electronic device, which increases the difficulty of layout design, and the overall thickness of the electronic device.

BRIEF SUMMARY OF THE DISCLOSURE

One aspect of the present disclosure provides an electronic device. The electronic device includes an antenna module configured to perform millimeter wave communication with an external radio frequency device; a radio frequency communication module configured to receive a millimeter wave communication signal transmitted by the external radio frequency device forwarded by the antenna module when the radio frequency communication module is connected with the antenna module; a radio frequency charging module configured to receive a millimeter wave charging signal transmitted by the external radio frequency device forwarded by the antenna module when the radio frequency charging module is electrically connected to the antenna module, and rectify the millimeter wave charging signal into a direct-current (DC) signal output; and a processing module electrically connected to the antenna module, the radio frequency communication module, and the radio frequency charging module, respectively. The processing module is configured to control the electrical connection between the antenna module and the radio frequency communication module, and/or the radio frequency charging module.

Another aspect of the present disclosure provides a control method. The method includes receiving, by an antenna module, a millimeter wave signal transmitted by an external radio frequency device, the millimeter wave signal including a millimeter wave communication signal and/or a millimeter wave charging signal; controlling, by a processing module, an electrical connection with a radio frequency communication module to transmit the millimeter wave communication signal to the radio frequency communication module; controlling, by the processing module, an electrical connection with a radio frequency charging module to transmit the millimeter wave charging signal to the radio frequency charging module; and rectifying, by the radio frequency charging module, the millimeter wave charging signal into a DC signal for output.

Another aspect of the present disclosure provides a non-transitory computer-readable storage medium containing computer-executable instructions for, when executed by one or more processors, performing a control method. The method includes receiving, by an antenna module, a millimeter wave signal transmitted by an external radio frequency device, the millimeter wave signal including a millimeter wave communication signal and/or a millimeter wave charging signal; controlling, by a processing module, an electrical connection with a radio frequency communication module to transmit the millimeter wave communication signal to the radio frequency communication module; controlling, by the processing module, an electrical connection with a radio frequency charging module to transmit the millimeter wave charging signal to the radio frequency charging module; and rectifying, by the radio frequency charging module, the millimeter wave charging signal into a DC signal for output.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

In order to address the limited space of electronic devices, the difficult to deploy corresponding antennas for different functional modules of the electronic devices, the difficult of device layout, and the hardware cost of the electronic devices, the present disclosure proposes to a multiplexed antenna for the electronic device. That is, multiple functional modules may share a set of antennas, which reduces the occupation of the limited space in the electronic device by deploying additional antennas, reduces the cost of the device, and satisfies the ultra-thin design requirements of the electronic device.

Figure 1:
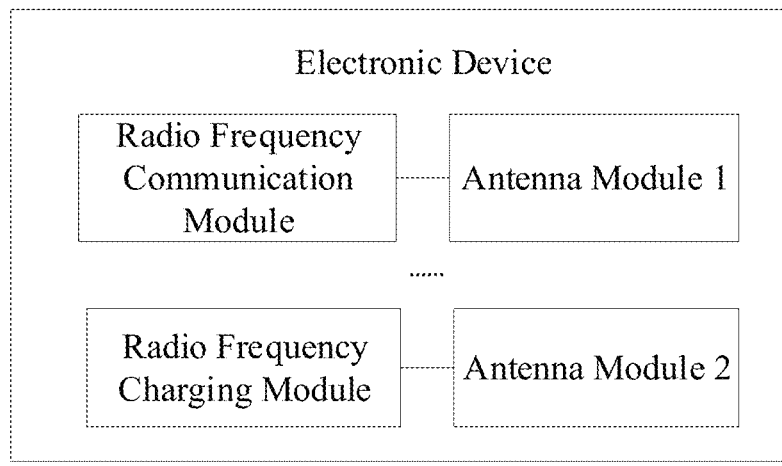
FIG. 1 is a schematic diagram of a hardware structure of an electronic device.

Based on the above technical concept, for a 5G millimeter wave integrated antenna array (hereinafter referred to as the antenna module) in a data communication application, and in conjunction with FIG. 1, the millimeter wave radio frequency signal obtained by an antenna module 1 can be transmitted to a radio frequency communication module. Under the control of a radio frequency chip in the radio frequency communication module, the low frequency signal may be output through the processing of a radio frequency transceiver, an intermediate frequency transceiver, and a baseband circuit in sequence. Similarly, the millimeter wave radio frequency signal generated by the electronic device may be transmitted through the antenna module through processing of the baseband circuit, the intermediate frequency transceiver, and the radio frequency transceiver to meet the radio frequency communication requirements of the corresponding application. It should be noted that the present disclosure does not describe the implementation process of the millimeter wave radio frequency communication application in detail.

In some embodiments, in order to improve the convenience of charging devices, radio frequency wireless charging may be used to meet the charging needs of the electronic devices. If the electronic device is configured as shown in FIG. 1, that is, the radio frequency charging module of the electronic device is electrically connected to an antenna module 2, the millimeter wave charging signal transmitted by the external radio frequency module can be received through the antenna module 2, sent to the radio frequency charging module, and rectified into a direct current signal output to meet the charging requirements of an energy storage module (such as battery), however, the issues described can still occur. In this regard, the present disclosure notes that the millimeter wave signal covers the millimeter wave frequency band required for radio frequency communication and the millimeter wave frequency band required for wireless charging, and these two frequency bands generally have certain differences. Therefore, the present disclosure proposes a multiplexed antenna module, that is, an antenna module that can be used to meet the requirement of radio frequency communication and wireless charging.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 2:
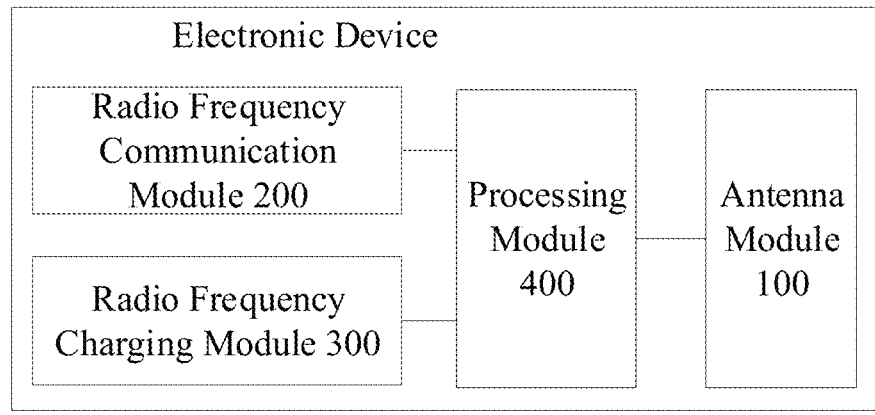
FIG. 2 is a schematic diagram of the hardware structure of the electronic device according to an embodiment of the present disclosure.

FIG. 2 is a schematic diagram of a hardware structure of an electronic device according to an embodiment of the present disclosure. The electronic devices may include, but are not limited to, mobile phones, tablet computers, laptop computers, wearable devices (such as smart watches, smart bracelets, pedometers, etc.), augmented reality (AR) devices, virtual reality (VR) devices, in-vehicle devices, smart speakers, robots, smart medical devices, etc. It should be noted that the product type of the electronic device is not limited in the present disclosure. The present disclosure can take any type of electronic device suitable for 5G millimeter wave communication requirements as an example for description. As shown in FIG. 2, the electronic device includes an antenna module 100, a radio frequency communication module 200, a radio frequency charging module 300, and a processing module 400.

In some embodiments, the antenna module 100 may be a millimeter wave antenna array, which can form several beams to improve the transmission distance in applications, and can generally support n258 (24.25 GHz-27.5 GHz), n260 (37 GHz-40 GHz), n261 (27.5 GHz-28.35 GHz), and other frequency bands. The millimeter wave signal of the required frequency band can be selected based on the application requirements of the electronic device, and the working principle of the millimeter wave antenna array will not be described in the present disclosure.

In some embodiments, the antenna module 100 may be a millimeter wave integrated antenna.

Figure 3:
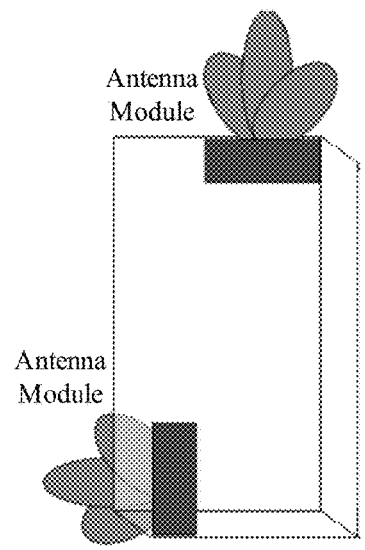
FIG. 3 is a schematic diagram of a layout of an antenna module in the electronic device according to an embodiment of the present disclosure.

In some embodiments, as shown in FIG. 3, the electronic device may be equipped with a plurality of antenna modules 100 to improve the comprehensiveness of coverage. However, the present disclosure does not limit the number of antenna modules 100 in the electronic device and the installation positions thereof, which can be determined based on the type of the electronic device and its overall assembly requirements, and is not described in detail in the embodiments of the present disclosure.

For any antenna module 100 in the electronic device, during the working process, millimeter wave communication can be performed with an external radio frequency device to meet the millimeter wave signal transmission requirements between the two, such as the radio frequency communication requirements between the electronic device and other electronic devices, the electronic device wireless charging needs, etc., depending on the situation. In some embodiments, the external radio frequency device may be a millimeter wave transceiver for transmitting/receiving a millimeter wave radio frequency signal, and the structure of the millimeter wave transceiver is not limited in the present disclosure.

In some embodiments, the antenna module 100 may include a dipole array antenna, and different dipole array antennas may have different millimeter wave sensing areas, thereby improving the comprehensive coverage of the millimeter wave signal transmission and reception of the electronic device. It should be noted that the present disclosure does not limit the number of antenna modules 100 and their installation positions in the electronic device, which can be determined based on the circumstances. The antenna module 100 may include, but is not limited to, a low cost, high efficiency, and simple structured dipole array antenna, and the working principle of the dipole array antenna will not be described in detail in the present disclosure.

The radio frequency communication module 200 may be configured to receive the millimeter wave communication signal, such as a millimeter wave signal of a specific frequency band used for realizing radio frequency communication, transmitted by the external radio frequency device forwarded by the antenna module 100 when the antenna module 100 and the radio frequency communication module 200 are electrically connected. Alternatively, the radio frequency communication module 200 may be configured to process to-be-transmitted information determined by the electronic device, generate a millimeter wave communication signal including the to-be-transmitted information, and transmit the millimeter wave communication signal through the electrically connected antenna module 100 to realize data interaction between the electronic device and other devices. The present disclosure does not describe the method of which the radio frequency communication module 200 uses the millimeter wave antenna to implement video communication in detail. For related description, reference can be made to FIG. 1 and the corresponding description.

The radio frequency charging module 300 may be configured to receive the millimeter wave charging signal, such as a specific millimeter wave signal used to realize wireless charging, transmitted by the external radio frequency device forwarded by the antenna module 100 when the radio frequency charging module 300 and the antenna module 100 are electrically connected. Subsequently, the millimeter wave charging signal can be rectified into a direct-current (DC) signal output to charge the energy storage module (such as the battery of the electronic device, etc.). That is, the video energy can be transmitted to the energy storage module to realize wireless charging of the energy storage module, such as charging the battery through millimeter wave radio frequency energy transmission. In the present disclosure, the energy storage module in the electronic device is used as a charging target, and the implementation process of receiving the power supply of the external radio frequency device will not be described in detail.

It should be understood that the electronic device described above may also be used as a power supply to supply power to other charging devices that implement wireless charging based on millimeter wave signals described in the present disclosure. In this case, the power supply may send an instruction to the millimeter wave transmitting circuit, triggering it to transmit a millimeter wave charging signal to the external device, thereby realizing the charging of the external device.

The processing module 400 may be respectively electrically connected to the antenna module 100, radio frequency communication module 200, and radio frequency charging module 300, and control the electrical connections between the antenna module 100 and the radio frequency communication module 200 and/or the radio frequency charging module 300. That is, based on the millimeter wave signal received by the antenna module 100, the application requirements of the electronic device, etc., the control of the radio frequency communication path between the antenna module 100 and the radio frequency communication module 200, and the wireless charging path between the antenna module 100 and the radio frequency charging module 300 can be realized to meet the communication requirements and charging requirements of the electronic device. The specific control process is not limited in the present disclosure.

In some embodiments, the processing module 400 may be configured to control the formation of the radio frequency communication path between the antenna module 100 and the radio frequency communication module 200 based on preset rules, while the wireless charging path is in an open state. Accordingly, the millimeter wave radio frequency signals can be transmitted through the radio frequency communication channel to meet the communication requirements of the electronic device and other devices. Alternatively, the processing module 400 may be configured to control the formation of the wireless charging path between the antenna module 100 and the radio frequency charging module 300, while the radio frequency communication path is in an open state. Accordingly, the millimeter wave charging signal can be transmitted through the wireless charging channel to meet the charging requirements for the energy storage module.

In some embodiments, the preset rules may include, but are not limited to, switching rules for the working time slots of the radio frequency communication path and the wireless charging path, the corresponding relationships between the preset millimeter wave radio frequency communication signal and the millimeter wave charging signal and the millimeter wave signal frequency band, etc. The present disclosure does not limit the content of the preset rules and its configuration method.

When the frequency band of the millimeter wave signal includes the frequency band required for millimeter wave radio frequency communication and the frequency band required for millimeter wave charging, the processing module 400 may select and control the formation of one of the radio frequency communication path and the wireless charging path based on the preset rules described above, filter out the millimeter wave signal of unneeded frequency band, and meet the corresponding communication or charging requirements. In other embodiments, the processing module 400 may also control the formation of a radio frequency communication path and a wireless charging path, such that these two paths can select the millimeter wave signal of the respective required frequency band for the radio frequency communication module and the radio frequency charging module, thereby meeting the radio frequency communication and wireless charging requirements of the electronic device. The present disclosure does not limit the control implementation process of the processing module 400 of the two paths described above, which can be set based on actual needs.

In some embodiments, the electronic device may include at least one millimeter wave device, and the antenna module 100, the radio frequency communication module 200, the radio frequency charging module 300, and the processing module 400 described above may be integrated in the millimeter wave device. The present disclosure does not limit the deployment method of the millimeter wave device in the electronic device, which can be set based on actual needs.

Figure 4:
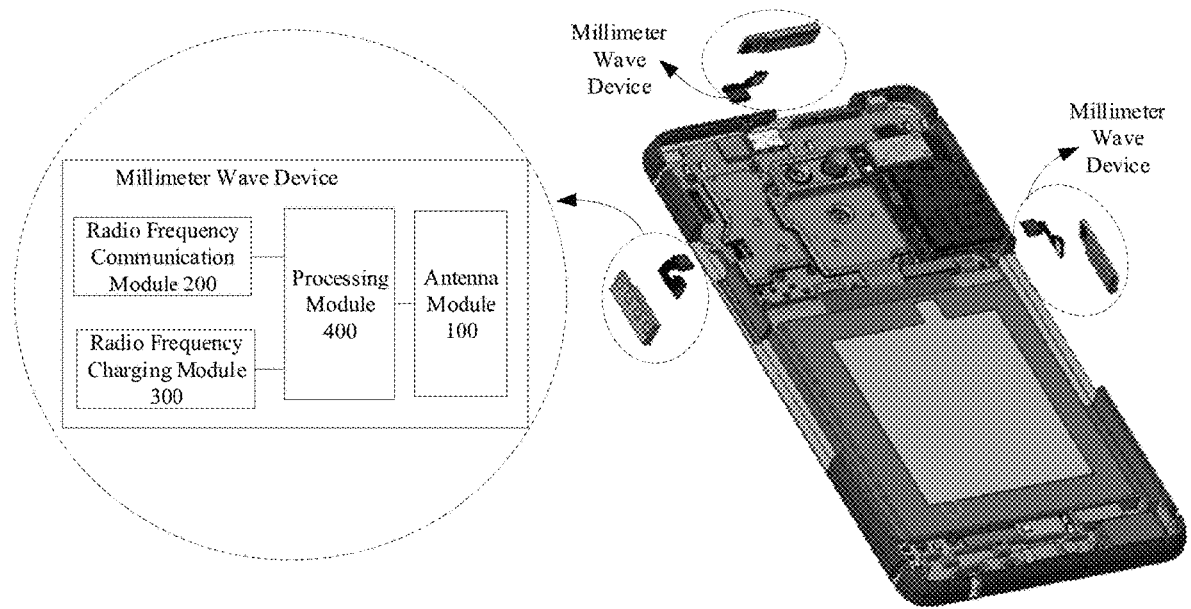
FIG. 4 is a schematic structural diagram of the electronic device according to an embodiment of the present disclosure.

In some embodiments, when there are a plurality of millimeter wave devices, in order to achieve comprehensive coverage, the plurality of millimeter wave devices may be disposed in different frames of the electronic device. FIG. 4 is a schematic assembly diagram of three millimeter wave devices. The three millimeter wave devices are respectively installed at the top, left border, and right border of the electronic device to meet the communication requirements with external radio frequency devices positioned in different directions of the electronic device, or to meet the wireless charging requirements of the electronic device with the external radio frequency devices. In some embodiments, the antenna module may be fixedly connected to other modules of the millimeter wave device through corresponding flexible connecting parts. The present disclosure does not limit the composition and structure of the flexible connecting parts, which can be set based on actual needs.

It should be noted that the present disclosure does not limit the number of millimeter wave devices included in the electronic device, and the installation positions of each millimeter wave device in the electronic device, which is not limited to the assembly positions shown in FIG. 4. In addition, for different types of electronic devices, the number of millimeter wave devices included in the electronic device, the assembly positions, etc. may be different, and can be set based on actual needs.

In addition, for different millimeter wave devices in the electronic device, based on the control method described above, at the same time, a plurality of millimeter wave devices may all work in the radio frequency communication mode, or all work in the wireless charging mode, or some millimeter wave device may work in the radio frequency communication mode, while other millimeter wave devices may work in the wireless charging mode. Of course, the millimeter wave devices may also work in the radio frequency communication mode and the wireless charging mode, and the energy storage module may also be wirelessly charged during the radio frequency communication. The present disclosure does not limit the respective working modes of the plurality of millimeter wave devices, which can be set based on actual needs.

In some embodiments, the radio frequency communication mode described above may refer to the working mode under which a radio frequency communication path is formed between the processing module 400 and the radio frequency communication module 200 in the millimeter wave device. The wireless charging mode described above may refer to a working mode in which a wireless charging path is formed between the processing module 400 and the radio frequency charging module 300 in the millimeter wave device. The present disclosure does not limit the control implementation methods of these two working modes.

Figure 5:
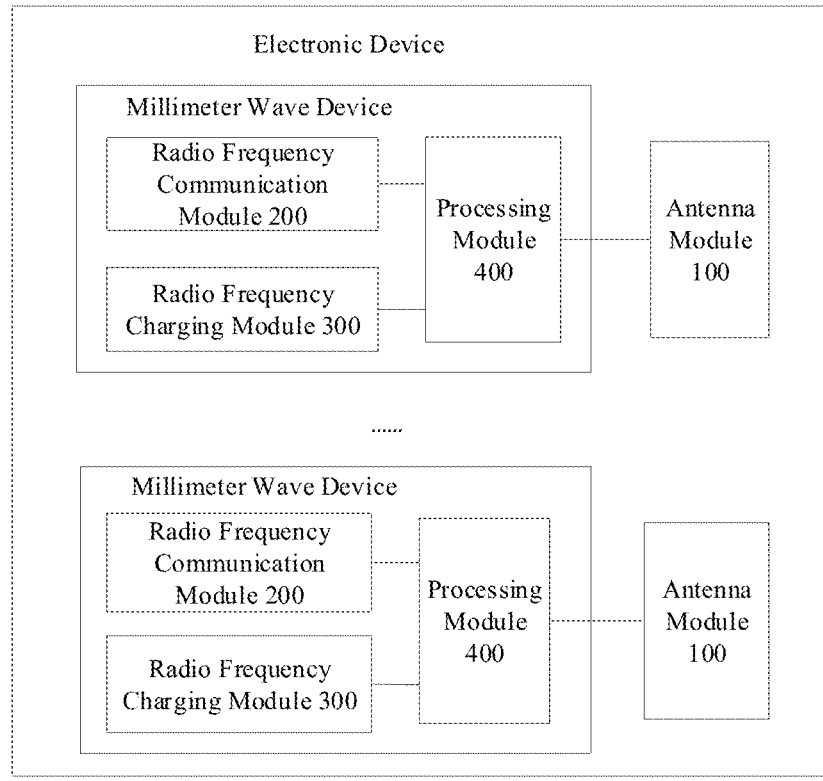
FIG. 5 is a schematic diagram of the hardware structure of the electronic device according to an embodiment of the present disclosure.

In some embodiments, as shown in FIG. 5, the radio frequency communication module 200, the radio frequency charging module 300, and the processing module 400 in the electronic device may be integrated in the millimeter wave device, but the antenna module 100 may be disposed outside the millimeter wave device. That is, the antenna module 100 may be integrated in the millimeter wave device and independently installed on the frame of the electronic device, which reduces the thickness requirement of the frame of the electronic device and improves the assembly flexibility of the millimeter wave device. The millimeter wave device may be installed in the vicinity of the corresponding antenna module 100 to facilitate the transmission of millimeter wave signals between the millimeter wave device and the antenna module 100. Based on actual needs, the millimeter wave device may also be installed on a motherboard on the back of the electronic device, thereby reducing the space occupied by the millimeter wave device on the frame position of the electronic device.

In other embodiments, if the electronic device includes a plurality of millimeter wave devices, a corresponding antenna module 100 may be configured for each millimeter wave device. Based on actual needs, the plurality of millimeter wave devices may also share an antenna module 100, which is not limited in the embodiments of the present disclosure. For the respective working modes of the plurality of millimeter wave devices, reference can be made to the descriptions of the foregoing embodiments. The working modes of each millimeter wave device may be the same or different, which can be determined based on actual needs.

Figure 6:
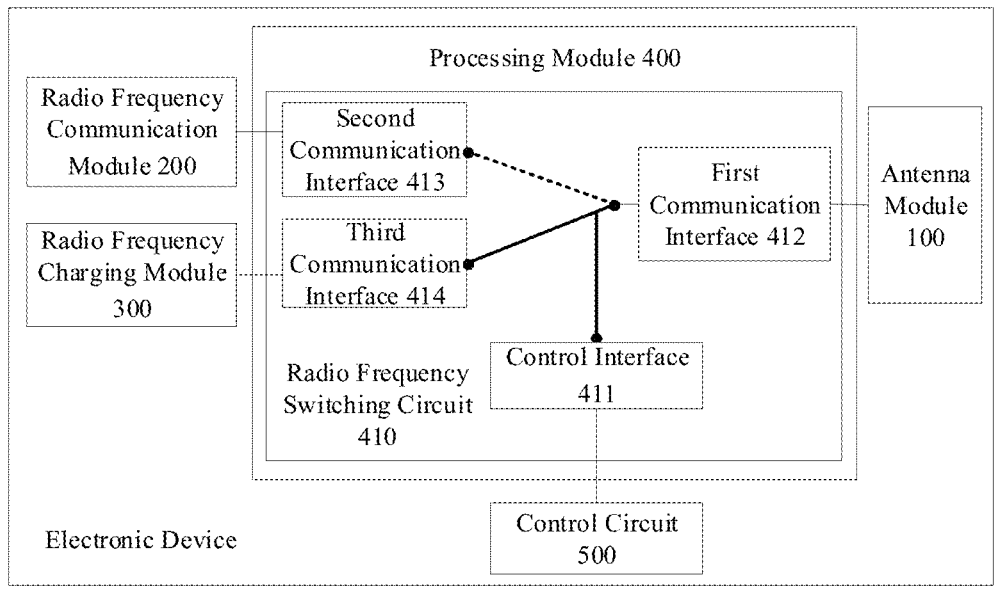
FIG. 6 is a schematic diagram of the hardware structure of the electronic device according to an embodiment of the present disclosure.

FIG. 6 is a schematic diagram of the hardware structure of the electronic device according to an embodiment of the present disclosure. This embodiment may be a refined structure of the processing module 400 in the electronic device described in the foregoing embodiments, but the refined structure of the processing module 400 is not limited in the present disclosure. For other component modules of the electronic device, reference can be made to the descriptions in the corresponding parts of the foregoing embodiments, which will not be repeated here. As shown in FIG. 6, the processing module 400 in the electronic device includes a radio frequency switching circuit 410. The radio frequency switching circuit 410 includes a control interface 411, a first communication interface 412, a second communication interface 413, and a third communication interface 414.

The first communication interface 412 may be electrically connected to the antenna module 100, the second communication interface 413 may be connected to the radio frequency communication module 200, the third communication interface 414 may be connected to the radio frequency charging module 300, and the first communication interface 412 may be connected with the second communication interface 413 or the third communication interface 414. Accordingly, when the first communication interface 412 and the second communication interface 413 are connected, a radio frequency communication path may be formed between the antenna module 100 and the radio frequency communication module 200. Further, when the first communication interface 412 and the third communication interface 414 are connected, a wireless charging path may be formed between the antenna module 100 and the radio frequency charging module 300.

The control interface 411 may be connected to a control circuit 500 (such as a controller or processor of an electronic device, etc.). in response to the control instruction sent by the control circuit 500, the control interface 411 may control the first communication interface 412 to connect with the second communication interface 413 or the third communication interface 414. If the control circuit 500 sends a first control instruction, the control interface 411 may control the first communication interface 412 to connect with the second communication interface 413 to form the radio frequency communication path, and transmit the millimeter wave communication signal sent by the first communication interface 412 to the radio frequency communication module 200. If the control circuit 500 sends a second control instruction, the control interface 411 may control the first communication interface 412 to connect with the third communication interface 414 to form the wireless charging path, and transmit the millimeter wave charging signal sent by the first communication interface 412 to the radio frequency charging module 300.

It can be seen that the radio frequency switching circuit 410 of the present disclosure can be a many-to-one switch circuit, such as a single-pole double throw switch. At the same time, the radio frequency switching circuit 410 may perform actions based on the content of the control instruction sent by the control circuit 500 to realize the electrical connection between the antenna module 100 and the radio frequency communication module 200 or the radio frequency charging module 300. Accordingly, the millimeter wave signal received by the antenna module 100 can be transmitted to the corresponding module through the established radio frequency communication path or the wireless charging path, thereby meeting the requirements of radio frequency communication or wireless charging. In present disclosure, after the radio frequency switching circuit 410 of the processing module 400 controls the formation of the radio frequency communication path or the wireless charging path, the working principle of how to realize the radio frequency communication or wireless charging based on the antenna module will not be described in detail. Further, the present disclosure does not limit the generation and implementation methods of the first control instruction and the second control instruction described above.

In some embodiments, the control circuit 500 may send the generated first control instruction or the second control instruction to the control interface 411 based on a time division duplex communication mode. That is, the present disclosure may pre-configure the time slot corresponding to the radio frequency communication mode in the time division duplex communication mode (which may be recorded as a first duration), and the time slot corresponding to the wireless charging communication mode (which may be recorded as a second duration). That is, the time slot for outputting the first control instruction (i.e., the first period), and the time slot for outputting the second control instruction (i.e., the second period) may be pre-configured. Accordingly, in some embodiments, the two time slots may continuously output the corresponding first control instruction or the second control instruction alternately, thereby controlling the entering of the radio frequency communication mode or the wireless charging mode. It should be noted that the duration of the time slot for outputting the first control instruction and the time slot for outputting the second control instruction may be different or the same, and can be set based on the application requirements of the electronic device, which are not limited in the present disclosure.

When the electronic device includes a plurality of millimeter wave devices, the control circuit may control each millimeter wave device based on the time division duplex communication mode in the working mode (such as the radio frequency communication mode and the wireless charging mode) during the control process. The time slots corresponding to generating the first control instruction and the second control instruction configured for different millimeter wave devices may the same or different, which is not limited in the present disclosure.

Consistent with the present disclosure, corresponding to the generation method of the first control instruction and the second control instruction, the radio frequency communication time slot may be configured by detecting whether the electronic device needs the radio frequency communication. In other time slots, that is, the millimeter wave communication is in an idle time slot, the operation of the radio frequency switching circuit may be controlled to realize the electrical connection between the antenna module and the radio frequency charging module.

In some embodiments, when the electronic device includes a plurality of millimeter wave devices (having an integrated module), if there is a need to charge the energy storage module of the electronic device, the proximity principle may be used to control one or more millimeter wave devices that are close to the external radio frequency device to enter the wireless charging mode, and transmit DC signals to the energy storage module. In this case, the present disclosure may use an edge detection algorithm to determine which one or more millimeter wave devices to enter the wireless charging mode. The present disclosure does not describe the implementation process of the edge detection algorithm in detail.

Figure 7:
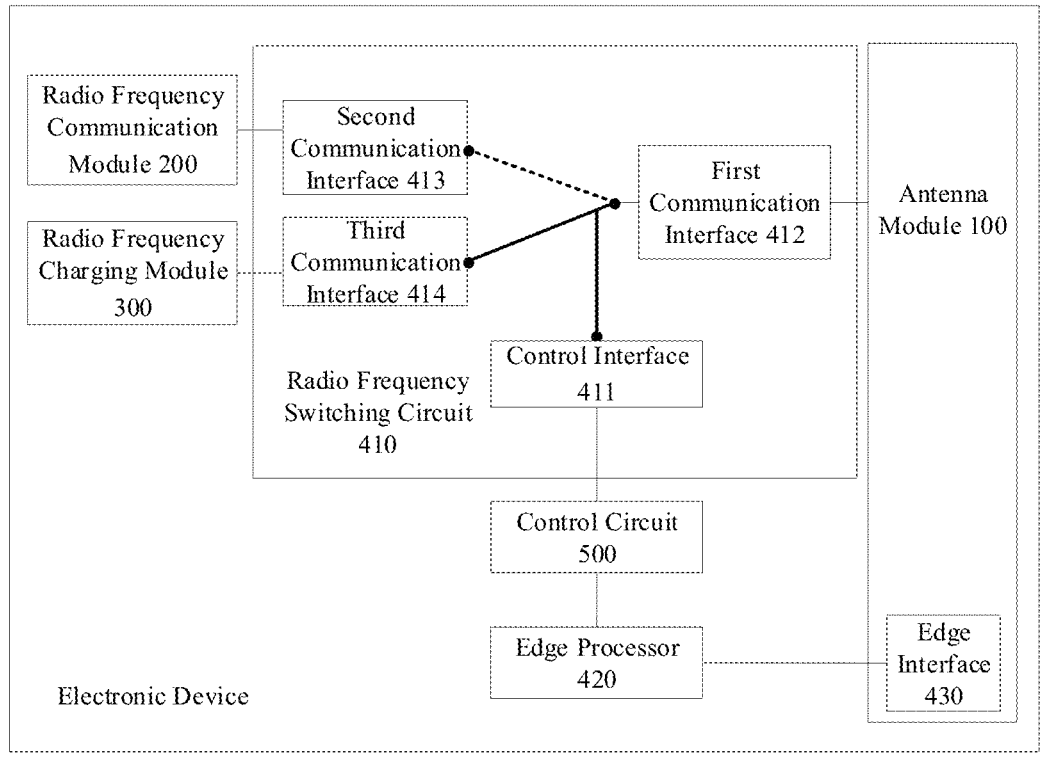
FIG. 7 is a schematic diagram of the hardware structure of the electronic device according to an embodiment of the present disclosure.

Based on this, as shown in FIG. 7, the processing module 400 may further include an edge processor 420 and an edge interface 430. The edge processor 420 may be integrated in the millimeter wave device, and the edge interface 430 (Edge Ant) may be positioned in the antenna module and connected to the edge processor 420 for sensing the millimeter wave signal received by the antenna module 100 to the edge processor 420.

The edge processor 420 may be connected to control the control circuit 500. Accordingly, when the edge processor 420 determines that the millimeter wave signal is the millimeter wave charging signal based on a signal attribute value of the millimeter wave signal, the charging switching instruction may be sent to the control circuit to cause the control circuit to execute the charging switching instruction, generate a corresponding control instruction, and control the connection between the first communication interface 412 and the third communication interface 414.

Combined with the above analysis, the edge processor 420 may first use an edge detection algorithm to determine the distance between its corresponding antenna module and the external radio frequency device, and send the distance to the control circuit. The control circuit may compare the distance detection results between the millimeter wave device and the external radio frequency device fed back by other edge processors 420, and determine a first number (such as one or N, the present disclosure does not limit the value of the first number) of millimeter wave devices with a shorter distance from the external radio frequency device.

Subsequently, the edge processor in the millimeter wave device may detect the signal attribute value of the millimeter wave signal received by the corresponding antenna module 100, such as the frequency band of the millimeter wave signal, and determine whether the millimeter wave signal is a millimeter wave charging signal or a millimeter wave radio frequency communication signal based on the signal attribute value. If the millimeter wave signal is a millimeter wave charging signal, a charging switching instruction may be generated to notify the control circuit to control the formation of a wireless charging path between the antenna module 100 and the radio frequency charging module 300.

Similarly, based on the method described above, if it is determined that the millimeter wave signal is a millimeter wave communication signal, a communication switching instruction can be generated, and a radio frequency communication path can be formed between the antenna module 100 and the radio frequency communication module 200 to meet the requirements of radio frequency communication. It should be noted that the signal attribute value may be used to distinguish millimeter wave charging signals from millimeter wave radio frequency communication signals, and may include, but is not limited to the signal frequency band described above.

In some embodiments, for the millimeter wave signal received by the antenna module 100, if the frequency band included in the signal includes both the charging frequency band of the millimeter wave charging signal and the communication frequency band of the millimeter wave radio frequency communication signal, in the present disclosure, the more complete frequency band included in the signal may be determined to determine the type of the millimeter wave signal, that is, the millimeter wave charging signal and the millimeter wave radio frequency communication signal.

That is, the type of the millimeter wave signal may be determined based on a type of millimeter wave charging signal or a millimeter wave radio frequency corresponding signal with a stronger signal included in the millimeter wave signal. However, the present disclosure is not limited thereto.

Figure 8:
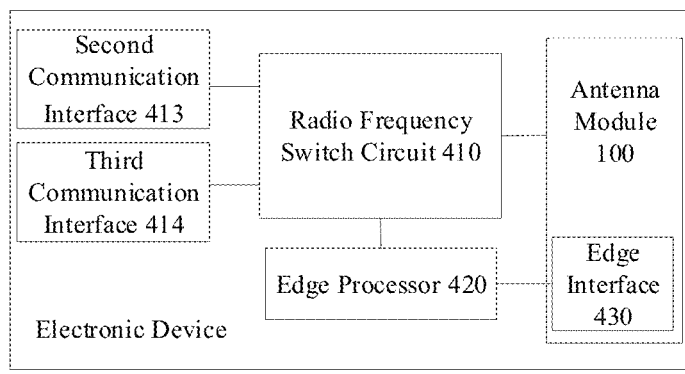
FIG. 8 is a schematic diagram of the hardware structure of the electronic device according to an embodiment of the present disclosure.

In some embodiments, as shown in FIG. 8, the edge processor 420 may also directly control the operation of the radio frequency switching circuit 410 to realize the switching between the radio frequency communication mode and the wireless charging mode of the millimeter wave device. That is, after determining that the millimeter wave signal is a millimeter wave communication signal or a millimeter wave charging signal based on the signal attribute value of the millimeter wave signal received by the antenna module 100, the edge processor 420 may directly execute the corresponding communication switching instruction or charging switching instruction to control the first communication interface 412 in the radio frequency switching circuit 410 to connect with the second communication interface 413 or the third communication interface 414. Accordingly, a radio frequency communication path may be formed between the antenna module 100 and the radio frequency communication module 200, or a wireless charging path may be formed between the antenna module 100 and the radio frequency charging module 300.

Figure 9:
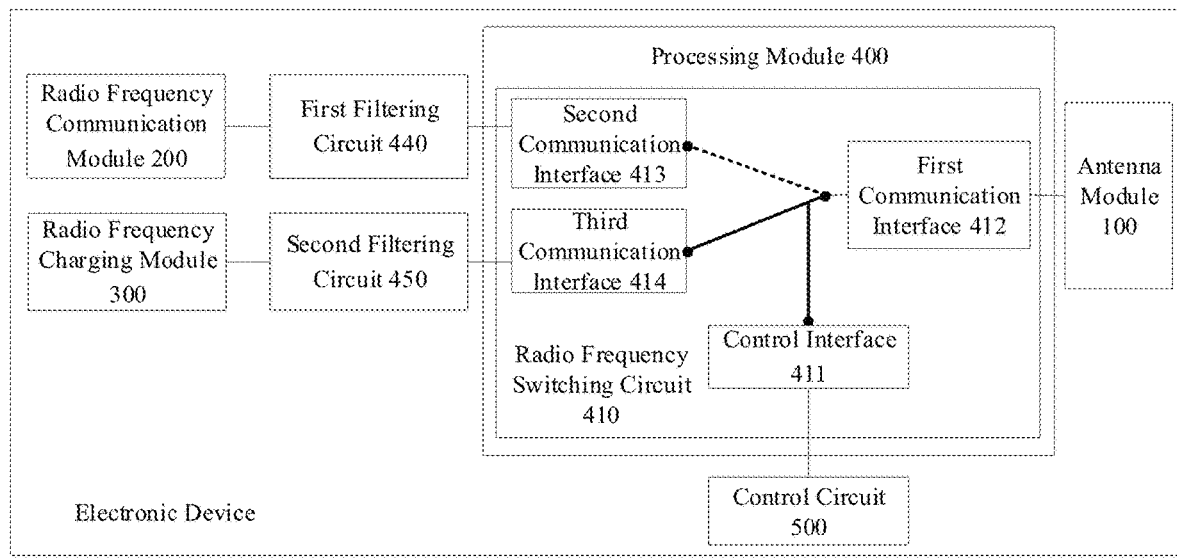
FIG. 9 is a schematic diagram of the hardware structure of the electronic device according to an embodiment of the present disclosure.
Figure 10:
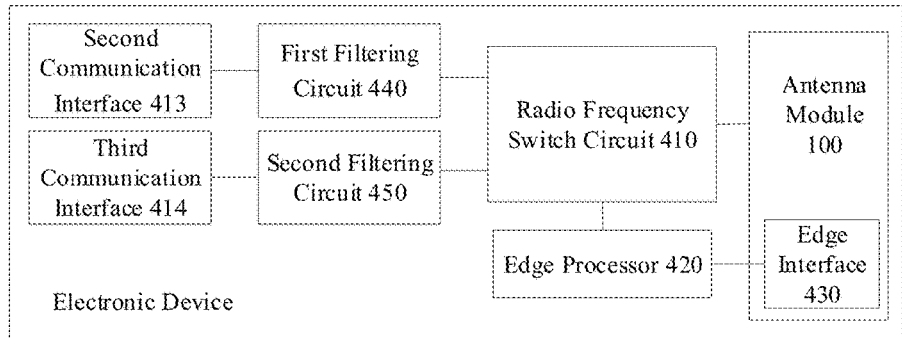
FIG. 10 is a schematic diagram of the hardware structure of the electronic device according to an embodiment of the present disclosure.

In some embodiments, in order to reduce signal interference, after determining the working mode of the millimeter wave device, a corresponding filtering circuit may be configured to filter out unnecessary millimeter wave signals to improve the reliability and efficiency of radio frequency communication, or improve the efficiency of wireless charging. Therefore, based on the descriptions of the foregoing embodiments, as shown in FIG. 9 and FIG. 10, the processing module 400 may further include a first filtering circuit 440 and a second filtering circuit 450.

In some embodiments, the first filtering circuit 440 may be respectively connected with the radio frequency communication module 200 and the second communication interface 413, and may be configured to filter out the millimeter wave charging signal in the millimeter wave signal output by the second communication interface 413, and transmit the obtained millimeter wave communication signal to the radio frequency communication module 200.

Accordingly, the second communication interface 413 can be connected to the radio frequency communication module 200 through the first filtering circuit 440. In the radio frequency communication mode, the millimeter wave signal output by the antenna module 100 may include a millimeter wave charging signal in the millimeter wave charging frequency band in addition to the millimeter wave communication signal in the millimeter wave communication frequency band. In this case, the first filtering circuit 440 may be used to filter the interference of the millimeter wave charging signal, and output a high-quality millimeter wave communication signal to the radio frequency communication module 200 to improve the quality of the radio frequency communication.

In some embodiments, the second filtering circuit 450 may be respectively connected to the radio frequency charging module 300 and the third communication interface 414, and may be configured to filter out the millimeter wave communication signal in the millimeter wave signal output by the third communication interface 414, and transmit the obtained millimeter wave charging signal to the radio frequency charging module 300.

Combined with the process of the wireless charging mode, since the millimeter wave signal output by the antenna module 100 may include both a millimeter wave communication signal and a millimeter wave charging signal, the millimeter wave communication signal can be considered as an interference signal for the radio frequency charging module 300. Therefore, after the millimeter wave signal output by the antenna module is transmitted to the third communication interface 414 through the first communication interface 412, and then transmitted to the second filtering circuit 450, the millimeter wave communication can be filtered. That is, the millimeter wave signal that does not belong to the charging frequency band can be filtered out, and the obtained millimeter wave signal can be recorded as the millimeter wave charging signal, and then transmitted to the radio frequency charging module 300. The rectifier circuit included in the radio frequency charging module 300 may rectify the millimeter wave charging signal into a DC signal and transmit it to the energy storage module to realize the charging of the energy storage module.

It should be noted that the present disclosure does not limit the specific circuit structures of the processing module 400 and the second filtering circuit 450. These filtering circuit can be flexibly configured based on the filtering requirements described above, which are not described in the present disclosure.

In addition, the first filtering circuit 440 may also be integrated in the radio frequency communication module 200, and the second filtering circuit 450 may also be integrated in the radio frequency charging module 300. The present disclosure does not limit the deployment relationship between the first filtering circuit 440 and the second filtering circuit 450 and other devices, which can be set based on actual needs.

In some embodiments, the separation of the millimeter wave communication signal and the millimeter wave charging signal is not limited to the switching method described above, and the present disclosure may also be implemented by using frequency division processing, especially in the scenario where electronic devices need to wirelessly charge their energy storage modules while perform radio frequency communication.

Figure 11:
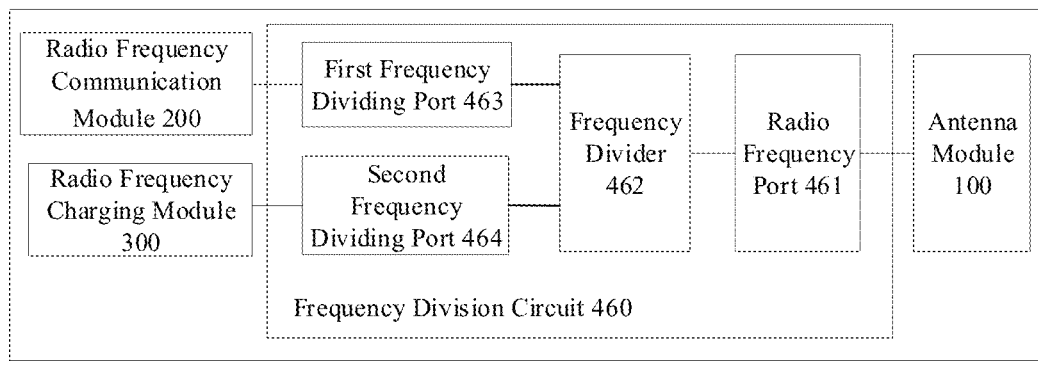
FIG. 11 is a schematic diagram of the hardware structure of the electronic device according to an embodiment of the present disclosure.

FIG. 11 is a schematic diagram of the hardware structure of the electronic device according to an embodiment of the present disclosure. As shown in FIG. 11, the processing module 400 further includes a frequency division circuit 460, and the frequency division circuit 460 includes a radio frequency port 461, a frequency divider 462, a first frequency dividing port 463, and a second frequency dividing port 464. In some embodiments, the radio frequency port 461 may be electrically connected to the antenna module 100, and the frequency divider 462 may be respectively connected to the radio frequency port 461, the first frequency dividing port 463, and the second frequency dividing port 464.

After the millimeter wave signal transmitted by the external radio frequency received by the antenna module 100 is transmitted to the radio frequency port 461, the received millimeter wave signal may be transmitted to the frequency divider 462. The frequency divider 462 may perform frequency division processing on the millimeter wave signal transmitted by the radio frequency port 461 to obtain the millimeter wave communication signal for the radio frequency communication module 200 and the millimeter wave signal for the radio frequency charging module 300. The present disclosure does not limit the method of which the frequency divider 462 realize the frequency division processing of the millimeter wave signal to obtain the millimeter wave communication signal having the radio frequency communication frequency band, and the millimeter wave charging signal having the wireless charging frequency band. The frequency division method may be based on, but is not limited to, the signal frequency band.

Subsequently, the first frequency dividing port 463 may transmit the millimeter wave communication signal to the radio frequency communication module 200 to meet the radio frequency communication requirements of the electronic device or its electronic components. The second frequency dividing port 464 may transmit the millimeter wave charging signal to the radio frequency charging module 300 to meet the wireless charging requirements of the energy storage module of the electronic device. The implementation process of radio frequency corresponding and the implementation process of wireless charging will not be described in detail.

Based on the descriptions of the foregoing embodiments, the frequency division circuit 460 may also replace the filtering circuits described above, thereby improving the millimeter wave signal of the required frequency band for the radio frequency communication module 200 or the radio frequency charging module 300. For the implantation process, reference can be made to the descriptions in the corresponding parts of the foregoing embodiments, which will not be repeated here.

In some embodiments, in order to realize the respective transmission of the millimeter wave communication signal and the millimeter wave charging signal described above, as shown in FIG. 12, the processing module 400 may further include a first signal transmission circuit 470 and a second signal transmission circuit 480. The first signal transmission circuit 470 may be configured to transmit the millimeter wave communication signal transmitted by the external radio frequency device received by the antenna module 100 to the radio frequency communication module 200. The second signal transmission circuit 480 may be configured to transmit the millimeter wave charging signal transmitted by the external radio frequency device received by the antenna module 100 to the radio frequency charging module 300.

Figure 12:
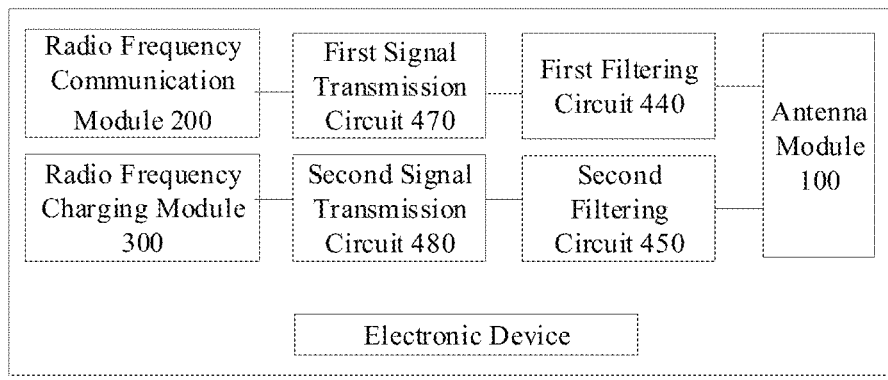
FIG. 12 is a schematic diagram of the hardware structure of the electronic device according to an embodiment of the present disclosure.

In practical applications, as shown in FIG. 12, in order to avoid signal interference, the first signal transmission circuit 470 is respectively connected to the first filtering circuit 440 and the radio frequency communication module 200. The second signal transmission circuit 480 is respectively connected to the second filtering circuit 450 and the radio frequency charging module 300. Accordingly, the first filtering circuit 440 may filter the millimeter wave signal output by the antenna module 100, and then transmit the obtained millimeter wave communication signal to the radio frequency communication module 200 through the first signal transmission circuit 470. Similarly, the second filtering circuit 450 may filter the millimeter wave signal output by the antenna module 100, and then transmit the obtained millimeter wave charging signal to the radio frequency charging module 300 through the second signal transmission circuit 480. The specific implementation process will not be described in detail in this embodiment.

It can be seen that the first signal transmission circuit 470 may be a radio frequency communication path for realizing millimeter wave communication signal transmission, and the second signal transmission circuit 480 may be a wireless charging path for realizing millimeter wave charging signal transmission. The present disclosure does not limit the composition of the two signal transmission circuits. The two signal transmission circuits may use any suitable signal transmission lines, or may be combined with or other signal transmission devices, which can be set based on actual needs.

In some embodiments, the first signal transmission circuit 470 and the second signal transmission circuit 480 may be integrated in the millimeter wave device. That is, the structure shown in FIG. 12 may be the structure of a millimeter wave device, and the electronic device may be configured with one or more millimeter wave devices. Of course, the structures of the plurality of millimeter wave devices configured in the electronic device may also be different, and any of the structures described in the foregoing embodiments may be adopted.

In some embodiments, the first signal transmission circuit 470 and the second signal transmission circuit 480, and the first filtering circuit 440 and second filtering circuit 450 may be assembled separately from the millimeter wave device described above. When the antenna module is not integrated in the millimeter wave device, the first filtering circuit 440 and the second filtering circuit 450 may be integrated in the antenna module. The first signal transmission circuit 470 and the second signal transmission circuit 480 may be two different signal transmission circuits for respectively realizing the connection between the antenna module 100 and the radio frequency communication module 200 and the radio frequency charging module 300. The specific assembly method and layout method are not limited in the present disclosure, and can be set based on actual needs.

In some embodiments, the radio frequency switching circuit 410 described above may also be replaced with the first signal transmission circuit 470 and the second signal transmission circuit 480. Accordingly, the built-in controller of the antenna module may transmit the received millimeter wave communication signal or the millimeter wave charging signal to the corresponding signal transmission circuit, and then transmit it to the corresponding radio frequency module. The implementation process will not be described in detail in the present disclosure.

Figure 13:
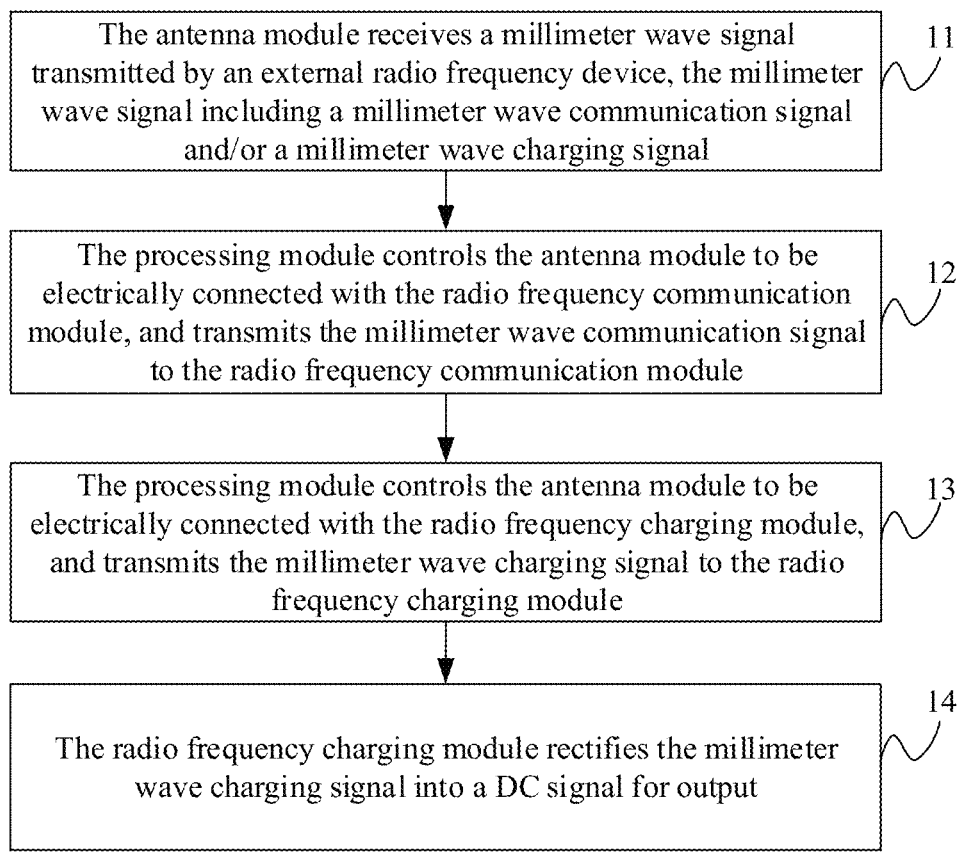
FIG. 13 is a flowchart of a control method applicable to an electronic device according to an embodiment of the present disclosure.

FIG. 13 is a flowchart of a control method applicable to an electronic device according to an embodiment of the present disclosure. The method can be applied to the electronic device described above. The method will be described in detail below.

11, the antenna module receives a millimeter wave signal transmitted by an external radio frequency device, the millimeter wave signal including a millimeter wave communication signal and/or a millimeter wave charging signal.

12, the processing module controls the antenna module to be electrically connected with the radio frequency communication module, and transmits the millimeter wave communication signal to the radio frequency communication module.

13, the processing module controls the antenna module to be electrically connected with the radio frequency charging module, and transmits the millimeter wave charging signal to the radio frequency charging module.

14, the radio frequency charging module rectifies the millimeter wave charging signal into a DC signal for output.

For the specific implementation process of each module in the electronic device performing the foregoing processes, reference can be made to the descriptions in the corresponding parts of the foregoing embodiments, which will not be repeated here. It should be understood that the processes at 12 and 13 may be performed simultaneously, or one of the processes may be performed, or the processes performed in sequence, which is not limited in the present disclosure, and can be set based on actual needs.

Consistent with the present disclosure, when the antenna module communicates with the external radio frequency device in millimeter wave, the processing module can control the antenna module to be electrically connected with the radio frequency communication module, and transmit the millimeter wave communication signal transmitted by the external radio frequency to the radio frequency communication module to meet the radio frequency communication requirements of the electronic device. The processing module can also control the antenna module to be electrically connected with the radio frequency charging module to realize the sharing of the antenna module, and transmit the millimeter wave signal transmitted by the external radio frequency device to the radio frequency charging module to rectify the signal into a DC signal to charge the energy storage module. The present disclosure uses the same antenna module, which can realize both radio frequency communication and wireless charging. The electronic device does not need to install two additional antenna modules, which reduces the installation space, layout difficulty and hardware cost, and is convenient to realize the ultra-thin design of the electronic device.

An embodiment of the present disclosure further provides a computer-readable storage medium having a computer program stored thereon. The computer program can be executed by a computer to implement the processes of the control method described in the foregoing embodiment.

According to the specifications and claims in the present application, unless otherwise specified in the context, articles such as "a," "an," and/or "the" do not necessarily indicate singular forms, and also include plural forms. Generally, expressions such as "include" and "comprise" are only used to indicate specified steps or elements. However, listings of these steps and elements are not exclusive, and methods or devices may also include other steps or elements.

In the description of the present disclosure, unless otherwise specified, "I" represents an "or" relationship between a preceding object and a following object. For example, "A/B" may represent A or B. The term "and/or" used in this application merely describes an association relationship between associated objects, and represents three possible relationships. For example, "A and/or B" may represent three scenarios: A alone, both A and B, and B alone, where A and B may be singular or plural. In addition, in the description of this application, "a plurality of" means two or more than two.

Further, in the present disclosure, relational terms such as first, second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

The embodiments in this specification are described in a progressive manner, each embodiment emphasizes a difference from the other embodiments, and the identical or similar parts between the embodiments may be made reference to each other. Since the apparatus and electronic device disclosed in the embodiments are corresponding to the methods disclosed in the embodiments, the descriptions of the apparatus and electronic device are simple and relevant parts may be made reference to the description of the methods.

The description of the disclosed embodiments is provided to illustrate the present application to those skilled in the art. Various modifications to these embodiments will be readily apparent to those skilled in the art, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. An electronic device comprising:
   an antenna module, the antenna module being configured to perform millimeter wave communication with an external radio frequency device;
   a radio frequency communication module, the radio frequency communication module being configured to receive a millimeter wave communication signal transmitted by the external radio frequency device forwarded by the antenna module when the radio frequency communication module is connected with the antenna module;
   a radio frequency charging module, the radio frequency charging module being configured to receive a millimeter wave charging signal transmitted by the external radio frequency device forwarded by the antenna module when the radio frequency charging module is electrically connected to the antenna module, and rectify the millimeter wave charging signal into a direct-current (DC) signal output; and
   a processing module electrically connected between the antenna module and the radio frequency communication module, and electrically connected between the antenna module and the radio frequency charging module, the processing module being configured to control the electrical connection between the antenna module and the radio frequency communication module, and/or the radio frequency charging module.

2. The electronic device of claim 1, wherein the processing module includes:
   a radio frequency switching circuit including a control interface, a first communication interface, a second communication interface, and a third communication interface, wherein:
   the control interface is used to connect a control circuit and is configured to control the first communication interface to connect with the second communication interface or the third communication interface in response to a control instruction sent by the control circuit;
   the first communication interface is electrically connected to the antenna module;
   the second communication interface is connected to the radio frequency corresponding module for transmitting the millimeter wave communication signal sent by the first communication interface to the radio frequency communication module; and
   the third communication interface is connected to the radio frequency charging module for transmitting the millimeter wave charging signal sent by the first communication interface to the radio frequency charging module.

3. The electronic device of claim 2, wherein:
the control circuit is configured to transmit a generated first control instruction or a generated second control instruction to the control interface based on a time division duplex communication mode, the first control instruction being used to instruct the first communication interface to be connected to the second communication interface, the second control instruction being used to instruction the first communication interface to be connected to the third communication interface.

4. The electronic device of claim 2, wherein the processing module further includes:
an edge processor and an edge interface, wherein:
the edge interface is disposed in the antenna module and is connected to the edge processor for transmitting the millimeter wave signal received by the antenna module to the edge processor; and
the edge processor is connected to the control circuit and is configured to determine whether the millimeter wave signal is the millimeter wave charging signal based on a signal attribute value of the millimeter wave signal, and transmit a charging switching instruction to the control circuit to cause the control circuit to execute the charging switching instruction, generate a corresponding control instruction, and control the connection between the first communication interface and the third communication interface.

5. The electronic device of claim 1, wherein:
the processing module includes a frequency division circuit, the frequency division circuit including a radio frequency port, a frequency divider, a first frequency dividing port, and a second frequency diving port, wherein:
the radio frequency port is electrically connected with the antenna module, and is configured to receive the millimeter wave signal transmitted by the external radio frequency device and received by the antenna module;
the frequency divider is connected to the radio frequency port, and is configured to perform frequency division processing on the millimeter wave signal transmitted by the radio frequency port to obtain the millimeter wave communication signal for the radio frequency communication module and the millimeter wave charging signal for the radio frequency charging module;
the first frequency dividing port is connected to the radio frequency communication module and the frequency divider, and is configured to transmit the millimeter wave communication signal to the radio frequency communication module; and
the second frequency dividing port is connected to the radio frequency charging module and the frequency divider, and is configured to transmit the millimeter wave charging signal to the radio frequency charging module.

6. The electronic device of claim 1, wherein:
the processing module includes a second filtering circuit and a frequency division circuit, wherein:
the first filtering circuit is connected to the radio frequency communication module, and is configured to filter out the millimeter wave charging signal in the millimeter wave signal output by the antenna module, and transmit an obtained millimeter wave communication signal to the radio frequency communication module; and
the second filtering circuit is connected to the radio frequency charging module, and is configured to filter out the millimeter wave communication signal in the millimeter wave signal output by the antenna module, and transmit an obtained millimeter wave charging signal to the radio frequency charging module.

7. The electronic device of claim 6, wherein:
the processing module further includes a first signal transmission circuit and a second signal transmission circuit, wherein:
the first signal transmission circuit is respectively connected with the first filtering circuit and the radio frequency communication module, and is configured to transmit the millimeter wave communication signal output by the first filtering circuit to the radio frequency communication module; and
the second signal transmission circuit is respectively connected with the second filtering circuit and the radio frequency charging module, and is configured to transmit the millimeter wave charging signal output by the second filtering circuit to the radio frequency charging module.

8. The electronic device of claim 1, wherein:
the electronic device includes at least one millimeter wave device, wherein:
the antenna module, the radio frequency communication module, the radio frequency charging module, and the processing module are integrated in the millimeter wave device; or,
the radio frequency communication module, the radio frequency charging module, and the processing module are integrated in the millimeter wave device, and the antenna module is disposed outside the millimeter wave device.

9. The electronic device of claim 8, wherein:
the electronic device includes a plurality of millimeter wave devices, the plurality of millimeter wave devices being disposed in different frames of the electronic device; and
the antenna module includes a plurality of dipole array antenna, the different dipole array antennas having different millimeter wave sensing areas.

10. A control method comprising:
receiving, by an antenna module, a millimeter wave signal transmitted by an external radio frequency device, the millimeter wave signal including a millimeter wave communication signal and/or a millimeter wave charging signal;
controlling, by a processing module, an electrical connection with a radio frequency communication module to transmit the millimeter wave communication signal to the radio frequency communication module;
controlling, by the processing module, an electrical connection with a radio frequency charging module to transmit the millimeter wave charging signal to the radio frequency charging module; and
rectifying, by the radio frequency charging module, the millimeter wave charging signal into a DC signal for output;
wherein the processing module is electrically connected between the antenna module and the radio frequency communication module, and is electrically connected between the antenna module and the radio frequency charging module.

11. The method of claim 10, wherein the processing module includes:
a radio frequency switching circuit including a control interface, a first communication interface, a second communication interface, and a third communication interface, wherein:

the control interface is used to connect a control circuit and is configured to control the first communication interface to connect with the second communication interface or the third communication interface in response to a control instruction sent by the control circuit;

the first communication interface is electrically connected to the antenna module;

the second communication interface is connected to the radio frequency corresponding module for transmitting the millimeter wave communication signal sent by the first communication interface to the radio frequency communication module; and the third communication interface is connected to the radio frequency charging module for transmitting the millimeter wave charging signal sent by the first communication interface to the radio frequency charging module.

12. The method of claim 11, wherein:

the control circuit is configured to transmit a generated first control instruction or a generated second control instruction to the control interface based on a time division duplex communication mode, the first control instruction being used to instruct the first communication interface to be connected to the second communication interface, the second control instruction being used to instruction the first communication interface to be connected to the third communication interface.

13. The method of claim 11, wherein the processing module further includes:

an edge processor and an edge interface, wherein:

the edge interface is disposed in the antenna module and is connected to the edge processor for transmitting the millimeter wave signal received by the antenna module to the edge processor; and the edge processor is connected to the control circuit and is configured to determine whether the millimeter wave signal is the millimeter wave charging signal based on a signal attribute value of the millimeter wave signal, and transmit a charging switching instruction to the control circuit to cause the control circuit to execute the charging switching instruction, generate a corresponding control instruction, and control the connection between the first communication interface and the third communication interface.

14. The method of claim 10, wherein:

the processing module includes a frequency division circuit, the frequency division circuit including a radio frequency port, a frequency divider, a first frequency dividing port, and a second frequency diving port, wherein:

the radio frequency port is electrically connected with the antenna module, and is configured to receive the millimeter wave signal transmitted by the external radio frequency device and received by the antenna module;

the frequency divider is connected to the radio frequency port, and is configured to perform frequency division processing on the millimeter wave signal transmitted by the radio frequency port to obtain the millimeter wave communication signal for the radio frequency communication module and the millimeter wave charging signal for the radio frequency charging module;

the first frequency dividing port is connected to the radio frequency communication module and the frequency divider, and is configured to transmit the millimeter wave communication signal to the radio frequency communication module; and the second frequency dividing port is connected to the radio frequency charging module and the frequency divider, and is configured to transmit the millimeter wave charging signal to the radio frequency charging module.

15. The method of claim 10, wherein:

the processing module includes a second filtering circuit and a frequency division circuit, wherein:

the first filtering circuit is connected to the radio frequency communication module, and is configured to filter out the millimeter wave charging signal in the millimeter wave signal output by the antenna module, and transmit an obtained millimeter wave communication signal to the radio frequency communication module; and the second filtering circuit is connected to the radio frequency charging module, and is configured to filter out the millimeter wave communication signal in the millimeter wave signal output by the antenna module, and transmit an obtained millimeter wave charging signal to the radio frequency charging module.

16. A non-transitory computer-readable storage medium containing computer-executable instructions for, when executed by one or more processors, performing a control method, the method comprising:

receiving, by an antenna module, a millimeter wave signal transmitted by an external radio frequency device, the millimeter wave signal including a millimeter wave communication signal and/or a millimeter wave charging signal;

controlling, by a processing module, an electrical connection with a radio frequency communication module to transmit the millimeter wave communication signal to the radio frequency communication module;

controlling, by the processing module, an electrical connection with a radio frequency charging module to transmit the millimeter wave charging signal to the radio frequency charging module; and rectifying, by the radio frequency charging module, the millimeter wave charging signal into a DC signal for output;

wherein the processing module is electrically connected between the antenna module and the radio frequency communication module, and is electrically connected between the antenna module and the radio frequency charging module.

17. The non-transitory computer-readable storage medium of claim 16, wherein the processing module includes:

a radio frequency switching circuit including a control interface, a first communication interface, a second communication interface, and a third communication interface, wherein:

the control interface is used to connect a control circuit and is configured to control the first communication interface to connect with the second communication interface or the third communication interface in response to a control instruction sent by the control circuit;

the first communication interface is electrically connected to the antenna module;

the second communication interface is connected to the radio frequency corresponding module for transmitting the millimeter wave communication signal sent by the first communication interface to the radio frequency communication module; and the third communication interface is connected to the radio frequency charging module for transmitting the millimeter wave charging signal sent by the first communication interface to the radio frequency charging module.

18. The non-transitory computer-readable storage medium of claim 17, wherein:
the control circuit is configured to transmit a generated first control instruction or a generated second control instruction to the control interface based on a time division duplex communication mode, the first control instruction being used to instruct the first communication interface to be connected to the second communication interface, the second control instruction being used to instruction the first communication interface to be connected to the third communication interface.

19. The non-transitory computer-readable storage medium of claim 17, wherein the processing module further includes:
an edge processor and an edge interface, wherein:
the edge interface is disposed in the antenna module and is connected to the edge processor for transmitting the millimeter wave signal received by the antenna module to the edge processor; and
the edge processor is connected to the control circuit and is configured to determine whether the millimeter wave signal is the millimeter wave charging signal based on a signal attribute value of the millimeter wave signal, and transmit a charging switching instruction to the control circuit to cause the control circuit to execute the charging switching instruction, generate a corresponding control instruction, and control the connection between the first communication interface and the third communication interface.

20. The non-transitory computer-readable storage medium of claim 16, wherein:
the processing module includes a frequency division circuit, the frequency division circuit including a radio frequency port, a frequency divider, a first frequency dividing port, and a second frequency diving port, wherein:
the radio frequency port is electrically connected with the antenna module, and is configured to receive the millimeter wave signal transmitted by the external radio frequency device and received by the antenna module;
the frequency divider is connected to the radio frequency port, and is configured to perform frequency division processing on the millimeter wave signal transmitted by the radio frequency port to obtain the millimeter wave communication signal for the radio frequency communication module and the millimeter wave charging signal for the radio frequency charging module;
the first frequency dividing port is connected to the radio frequency communication module and the frequency divider, and is configured to transmit the millimeter wave communication signal to the radio frequency communication module; and
the second frequency dividing port is connected to the radio frequency charging module and the frequency divider, and is configured to transmit the millimeter wave charging signal to the radio frequency charging module.

\* \* \* \* \*